(12) United States Patent
Kaszczak

(10) Patent No.: US 6,351,208 B1
(45) Date of Patent: Feb. 26, 2002

(54) DEVICE FOR PREVENTING DETECTION OF A TRAFFIC VIOLATION

(76) Inventor: Peter P. Kaszczak, 32 Centre St., Yonkers, NY (US) 10701

( * ) Notice: Subject to any disclaimer, the term of this patent is extended or adjusted under 35 U.S.C. 154(b) by 0 days.

(21) Appl. No.: 09/457,957

(22) Filed: Dec. 9, 1999

Related U.S. Application Data

(60) Provisional application No. 60/113,374, filed on Dec. 23, 1998.

(51) Int. Cl.[7] .................................................. B60Q 1/00
(52) U.S. Cl. ..................... 340/425.5; 340/965; 340/937; 362/497; 362/540
(58) Field of Search ................................ 340/905, 937, 340/933, 425.5, 332; 362/497, 540

(56) References Cited

U.S. PATENT DOCUMENTS

| | | | | |
|---|---|---|---|---|
| 5,041,828 A | * | 8/1991 | Loeven | 340/937 |
| 5,382,953 A | * | 1/1995 | Hauptli | 340/937 |
| 5,432,547 A | * | 7/1995 | Toyama | 348/149 |
| 5,510,764 A | * | 4/1996 | Hauptli | 340/433 |
| 5,515,042 A | * | 5/1996 | Nelson | 340/937 |
| 6,160,494 A | * | 12/2000 | Sodi et al. | 340/936 |
| 6,161,066 A | * | 12/2000 | Wright et al. | 701/36 |
| 6,281,808 B1 | * | 8/2001 | Glier et al. | 340/933 |

* cited by examiner

Primary Examiner—Daryl Pope
(74) Attorney, Agent, or Firm—Goldstein Law Offices P.C.

(57) ABSTRACT

A device for preventing detection of a traffic violation comprising an ultraviolet laser emitter that interferes with the photographing of a traffic violation or the violating car by an automatic camera installed on a traffic signal. The automobile is provided with a plurality of ultraviolet laser emitter devices adjacent to the license plate that prevent the photographing of the violating automobile's license plates. The automobile may also include ultraviolet laser emitter devices on its planar surface to further prevent the automatic photographing of the automobile.

2 Claims, 1 Drawing Sheet

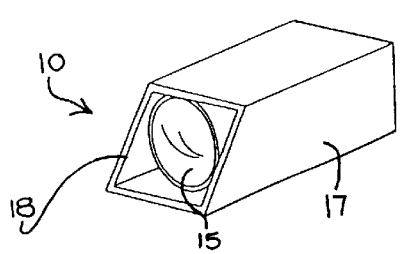
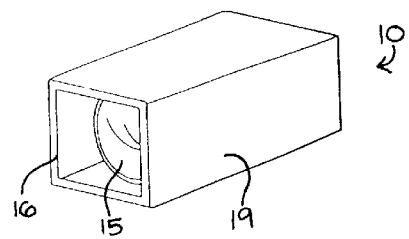
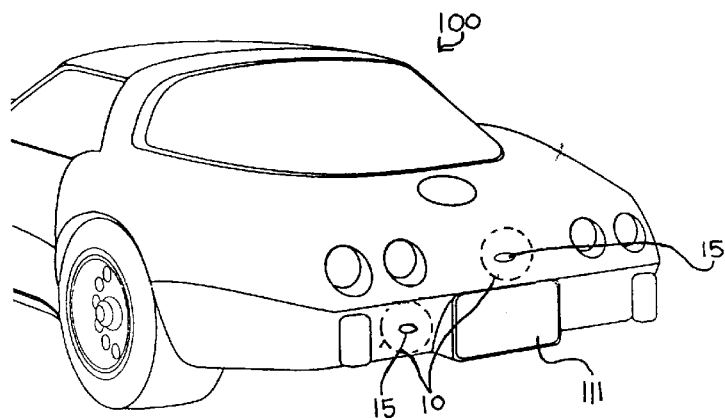
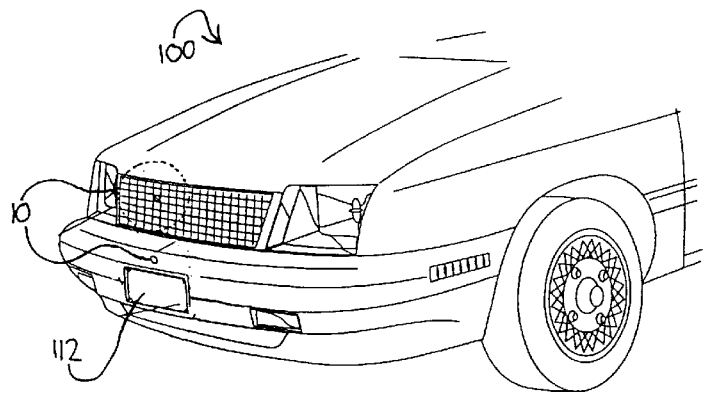

DEVICE FOR PREVENTING DETECTION OF A TRAFFIC VIOLATION

CROSS REFERENCES AND RELATED SUBJECT MATTER

This application relates to subject matter contained in provisional patent application Ser. No. 60/113,374, filed in the United States Patent Office on Dec. 23, 1998.

BACKGROUND OF THE INVENTION

The present invention relates to a device for preventing detection of a traffic violation. More particularly, the invention relates to an ultraviolet laser emitter that prevents the traffic monitoring camera in photographing traffic violations. Traffic safety is a major concern for drivers on major highways and local roadways alike. To ensure safety, many states attempt to monitor and discourage reckless or dangerous driving by punishing the reckless driver. For example, it is a routine practice to issue a ticket to drivers caught driving over the posted speed limit. Generally, each ticket issued results in a monetary fine that must be paid by the driver or the vehicle's owner.

To catch all speeding or reckless drivers, many states utilize automatic cameras that photograph people driving at speeds over the posted speed limit or those who drive through a traffic light during a stop period. These cameras automatically monitor road intersections by having a sensor positioned at a point along the road near a traffic signal. The sensor supplies a signal when a vehicle passes over it. If the signal appears during the "stop" interval of the traffic light, i.e. a vehicle has entered the road intersection during the stop interval contrary to the traffic regulations, a photographic camera will be triggered. Generally, a photograph is made of the traffic violation and also of the license plate of the violating vehicle.

However, there are times when a traffic signal changes from "go" to "stop" rather suddenly, and a vehicle is unable to make an immediate stop. At other times, poor weather conditions make it difficult to make sudden stops, such as when it is snowing or raining heavily or when the air is excessively foggy. There may be other times when a vehicle is traveling very slightly over the posted speed limit, and is cited with a traffic violation. As any day to day driver knows, these infractions may occur without any reckless intent on the part of the driver. While dangerous driving must be prevented and discouraged, it is indeed desirable that innocent infractions of driving rules not result in an automatic citation against the driver or the vehicle owner without consideration of the extenuating circumstances.

As a result, there is a need for a device that allows the driver of a vehicle to prevent the traffic monitoring camera from automatically photographing the license plate number of a vehicle to thereby prevent issuance of a violation.

SUMMARY OF THE INVENTION

It is an object of the present invention to provide a device for preventing an automatic camera from photographing a traffic violation or the violating automobile's identity. Accordingly, a ultraviolet laser emitter is disclosed that interferes with the photographing of the violation or the violating automobile's license plate.

It is another object of the present invention to provide a ultraviolet laser emitter that may be mounted on the automobile's bumper or any other planar surface of the automobile.

To accomplish these and other related objects, the present invention may be embodied in the forms illustrated in the enclosed drawings. It is to be noted that the scope of the present invention is not limited by this description or the enclosed drawings, and may include other embodiments as would be apparent to those skilled in the art of the present invention.

BRIEF DESCRIPTION OF THE DRAWINGS

For a better understanding of the above and other features of the present invention, reference should be made to the following detailed description of the preferred embodiments illustrated in the accompanying drawings, wherein:

FIG. 1 is a front perspective view of a ultraviolet laser emitter device that is mounted on an automobile bumper.

FIG. 2 is a front perspective view of a ultraviolet laser emitter device that is mounted on a flat surface of an automobile.

FIG. 3 is a perspective view of the rear side of an automobile embodying the ultraviolet laser emitter in accordance with the present invention.

FIG. 4 is a front perspective view of an automobile embodying the ultraviolet laser emitter in accordance with the present invention.

DETAILED DESCRIPTION OF THE PREFERRED EMBODIMENTS

FIGS. 1 and 2 illustrate an ultraviolet laser emitter device 10. As shown in FIG. 1, the ultraviolet laser emitter device 10 comprises a laser gun 15 that is capable of emitting laser light of an ultraviolet wavelength. The ultra violet light interferes with the operation of the automatic cameras that detect and photograph the traffic violations by the automobile. The interference by the ultraviolet light ensures that the photograph taken by the automatic camera is either inaccurate or blurred, which makes detection of the violation or the violating automobile difficult.

The ultraviolet laser emitter device 10 is provided with a mechanism to detect the presence of an automatic camera on a traffic signal at a roadway intersection or along the road. A suitable mechanism for detecting the presence of an automatic camera is a flash detector. The flash detector is mounted adjacent to the emitter device, wherein a rapid change in ambient illumination, which would typically indicate a flash of light, activates the laser emitter device. In a system having multiple laser emitters, flash detectors are preferably located adjacent to each laser emitter device, so that they will detect a flash directed at the area of the vehicle which that laser emitter device is protecting.

An alternate embodiment of the ultraviolet laser emitter device 10 may be provided that continuously emits laser beams of ultraviolet light to ensure that there is no possibility of any automatic camera photographing the traffic violation of the violating vehicle.

The laser gun 15 is housed in a bumper housing 17 that is shaped as a substantially rectangular tube. According to the one embodiment, the bumper housing 17 has a front surface 18 with a slope. The slope on the front surface 18 facilitates the installation of the ultraviolet laser emitter device 10 on the top portion of an automobile bumper. Installing the ultraviolet laser emitter device 10 on the top portion of the automobile bumper ensures that the ultraviolet laser emitter device 10 is not obstructed by any other part of the automobile 100, as shown in FIGS. 3 and 4.

According to an alternate embodiment of the ultraviolet laser emitter device 10, the laser gun 15 is located in a box housing 19. The box housing 19 is provided with a rear surface 16 that is essentially flat to allow the mounting of the ultraviolet laser emitter device 10 on flat planar surfaces of the automobile 100.

As shown in FIG. 3, the automobile 100 is provided with at least one ultraviolet laser emitter device 10 adjacent to the rear license plate 111. The ultraviolet laser emitter device 10 adjacent to the rear license plate 111 prevents the photographing of the vehicle's rear license plate 111 by the automatic camera installed on a traffic signal. The ultraviolet laser emitter device 10 is installed on the top surface of the automobile's bumper using the bumper housing 17, which ensure that the ultraviolet laser emitter device 10 is not obstructed.

Another ultraviolet laser emitter device 10 is provided over the vehicle's rear license plate 111 to emit laser light to distract the photographing by the automatic camera of any potential violation by the driver.

The automobile 100 is also provided with at least one ultraviolet laser emitter device 10 adjacent to the front license plate 112. The ultraviolet laser emitter device 10 adjacent to the front license plate 112 prevents the photographing of the vehicle's front license plate 112. Another ultraviolet laser emitter device 10 may be provided over the front license plate 112.

Many specific details contained in the above description merely illustrate some preferred embodiments and should not be construed as a limitation on the scope of the invention. Accordingly, many other variations are possible within the scope of the present invention.

What is claimed is:

1. A device for preventing detection of an automobile by a traffic monitoring camera, the automobile having at least one license plate, comprising:

at least one ultraviolet laser gun, said laser emitter located adjacent to at least one of the license plates.

2. The device for preventing detection of an automobile by a traffic monitoring camera as recited in claim 1, further comprising a flash detector, for detecting a flash of light, wherein the ultraviolet laser is activated by the flash detector upon the presence of a flash of light.

* * * * *